United States Patent
Fan

(10) Patent No.: US 6,783,023 B1
(45) Date of Patent: Aug. 31, 2004

(54) LEGGED POT

(76) Inventor: Jian-Hua Fan, 5800 Maudina Ave., #C2, Nashville, TN (US) 37209

( * ) Notice: Subject to any disclaimer, the term of this patent is extended or adjusted under 35 U.S.C. 154(b) by 0 days.

(21) Appl. No.: 08/990,195

(22) Filed: Dec. 12, 1997

(51) Int. Cl.$^7$ ................................................ A01G 9/02

(52) U.S. Cl. .................. 220/571; 220/628; 220/636; 206/423; 47/66

(58) Field of Search ................................. 220/571, 600, 220/628, 635, 636; 206/423; 47/66, 41.01, 901

(56) References Cited

U.S. PATENT DOCUMENTS

| | | | | |
|---|---|---|---|---|
| 320,588 A | * | 6/1885 | Rhoads | |
| 1,216,642 A | * | 2/1917 | White | 47/80 |
| 1,247,766 A | | 11/1917 | White | |
| 1,778,150 A | * | 10/1930 | Freeburg | |
| 2,072,185 A | * | 3/1937 | Schein | |
| 3,027,684 A | | 4/1962 | Keiding | |
| 3,220,144 A | * | 11/1965 | Green | 47/80 |
| 3,611,633 A | * | 10/1971 | Shackelford | 206/423 |
| 3,866,351 A | * | 2/1975 | Cobia | |
| 3,965,616 A | * | 6/1976 | Ridgeway | |
| 3,990,179 A | * | 11/1976 | Johnson et al. | 206/423 |
| 4,059,920 A | | 11/1977 | Worrell | |
| 4,092,804 A | * | 6/1978 | Morris et al. | |
| D250,401 S | | 11/1978 | O'Shea et al. | |
| 4,224,764 A | * | 9/1980 | Dziewulski et al. | |
| 4,231,187 A | | 11/1980 | Greenbaum | |
| 4,250,665 A | | 2/1981 | English et al. | |
| 4,299,055 A | | 11/1981 | Dziewulski et al. | |
| 4,324,070 A | | 4/1982 | Swisher | |
| 4,339,891 A | | 7/1982 | Bassett | |
| 4,344,251 A | | 8/1982 | Edling | |
| 4,442,629 A | * | 4/1984 | Anderson | |
| 4,553,352 A | * | 11/1985 | Powell et al. | 220/DIG. 6 |
| 4,760,987 A | * | 8/1988 | Lan | |
| 4,833,823 A | * | 5/1989 | Edwards, III | |
| 4,880,156 A | * | 11/1989 | Wallet | 220/DIG. 6 |
| 4,885,869 A | | 12/1989 | Kim | |
| 4,885,870 A | | 12/1989 | Fong | |
| 4,937,974 A | | 7/1990 | Costa, Jr. et al. | |
| D313,203 S | * | 12/1990 | Carlson | |
| 4,975,251 A | * | 12/1990 | Saceman | |
| 5,209,013 A | * | 5/1993 | Sellers | |
| 5,309,670 A | * | 5/1994 | Bates | |
| 5,341,596 A | | 8/1994 | Kao | |
| D352,480 S | * | 11/1994 | Carlson | 47/79 X |
| D363,255 S | * | 10/1995 | Helms et al. | |
| 5,564,226 A | | 10/1996 | Paramest | |
| 5,638,638 A | | 6/1997 | Moskowitz | |
| D384,907 S | | 10/1997 | Moskowitz | |
| 5,797,217 A | * | 8/1998 | Magee | |
| 5,806,241 A | * | 9/1998 | Byland et al. | 47/81 |
| D399,450 S | | 10/1998 | Durbin | |
| D399,451 S | | 10/1998 | Durbin | |
| D399,452 S | | 10/1998 | Durbin | |
| D399,453 S | | 10/1998 | Durbin | |
| D399,454 S | | 10/1998 | Durbin | |
| 5,871,476 A | | 2/1999 | Hand | |

FOREIGN PATENT DOCUMENTS

| | | | | |
|---|---|---|---|---|
| CH | 308827 | * | 8/1955 | 47/80 |
| CH | 308827 | | 10/1955 | |
| DE | 1 200 604 | | 9/1965 | |
| DE | 2433734 | * | 1/1976 | 220/DIG. 6 |
| DE | 25 39 552 A1 | | 3/1977 | |
| DE | 3131 282 A1 | | 2/1983 | |
| DE | 32131282 A1 | * | 2/1983 | 47/79 |
| DE | 35 10513 A1 | | 9/1986 | |
| DE | 3510513 A1 | * | 9/1986 | 47/79 |

(List continued on next page.)

Primary Examiner—Joseph Man-Fu Moy

(57) ABSTRACT

A legged pot has a pot body and at least one leg. The leg has a fluid conduit in fluid communication to and from the pot body. The legged pot can be used with a fluid source, a plastic film, or a tray to reduce watering cost, labor and material cost, water and fertilizer lose, environmental contaminate, and soil in use, and to avoid plant damage by water.

1 Claim, 3 Drawing Sheets

FOREIGN PATENT DOCUMENTS

| | | | | |
|---|---|---|---|---|
| EP | 0 769 243 A1 | | 4/1997 | |
| FR | 579120 | * | 3/1924 | ..................... 47/81 |
| FR | 579120 | | 10/1924 | |
| FR | 1.024.483 | | 4/1953 | |
| FR | 1024483 | * | 4/1953 | ..................... 47/80 |
| FR | 1263364 | * | 5/1961 | ..................... 47/80 |
| FR | 1.263.364 | | 12/1961 | |
| FR | 649568 | * | 6/1964 | ..................... 47/81 |
| FR | 649568 | | 10/1964 | |
| FR | 1 544 194 | | 10/1968 | |
| FR | 2 310 695 | | 12/1976 | |
| FR | 2 724 813 A1 | | 3/1996 | |
| GB | 4743 | | of 1894 | |
| GB | 22647 | * | 10/1912 | ..................... 47/80 |
| GB | 22647 | | 8/1913 | |
| GB | 1112153 | * | 5/1968 | ..................... 47/79 |
| GB | 1192431 | * | 5/1970 | ..................... 47/81 |
| GB | 1 316 159 | | 5/1973 | |
| GB | 2 240 250 A | | 7/1991 | |
| GB | 2240250 A | * | 7/1991 | ..................... 47/79 |
| GB | 4743 | * | 1/2000 | ..................... 47/79 |
| JP | 6-141683 | | 5/1994 | |
| NL | 8 800273 | | 9/1989 | |
| WO | WO 96/35326 | | 11/1996 | |

* cited by examiner

LEGGED POT

BACKGROUND OF THE INVENTION

I. Field of the Invention

This invention relates to a new design of pots, "Legged Pots", for plants, flowers, or vegetable growth to reduce products cost and environmental contamination by fertilizer and pesticide. The legged pot is a valuable pot to save labor and material cost, to reduce water and fertilizer loss, and soil use. It is very useful in greenhouses, nursery fields, residential, and commercial places.

II. Description of Related Art

Traditional pots have no legs, only few holes on the bottom for draining excess water to avoid plant damage. But, the plant must be watered frequently. If tray is used to hold water, the plant can be easily damaged. In greenhouses or nursery fields, the pots are sit on the ground or on the table with no flat. As a result, fertilizer and/or pesticide drain out with the water from the pot into the ground causing environmental contamination.

In greenhouse and nursery field, watering cost is very high. Scientists use trickle irrigation system to reduce the watering cost. The system worked well to solve this problem. However, the cost for setting up the system (both labor and material costs) is still high, and workers have to frequently check each dropper to insure it is working properly. Sometimes the water bill increases, which means more water is wasted by using this method. The problem of soil and ground water contamination by fertilizer and pesticide is still not solved. Not many producers like to use the trickle irrigation system.

Scientists also use the wick method to reduce the frequency of watering needed for small pots. The problem of over-watering is solved using this method. However, the pot's cost doubles because a support pot has to be used, and the wick has to be inserted by hand. The limitation of this method is that the wick can be used only in small pots.

Some producers use hydroponics to produce their products. This method includes sand culture, and requires a concrete construction. The cost is very high, the plants are easily damaged by water, and disease spread is very likely.

SUMMARY OF THE INVENTION

"Legged Pot" means there are legs under the pots (see FIG. 1). The legs are filled with soil. It is so that water can be absorbed by the soil from a plastic film or tray. This way the plant will not be damaged by water, water will never be lost, and hand watering is now unnecessary in greenhouses and nursery fields.

DETAILED DESCRIPTION OF THE PREFERRED EMBODIMENT

The Legged Pot, my invention, has more advantages than regular pots with the trickle irrigation system and wick method. Legged Pots with plastic film flat in greenhouses and nursery fields or with a tray in residential or commercial places are the best design for plant growth. All the problems of traditional pots with the trickle irrigation and wick method are solved when using this design of pots. No water is lost, no fertilizer or pesticide goes into the ground, and the water will never damage the plants. Material cost is very low. Less soil is used because the soil environment in the pot is improved. Almost no watering cost. Only thing needed for watering plants is just turning on the faucet in greenhouses and nursery fields. Possibility of disease spread is dramatically decreased. Watering plants once a month in residential and commerce place.

Figure 1:
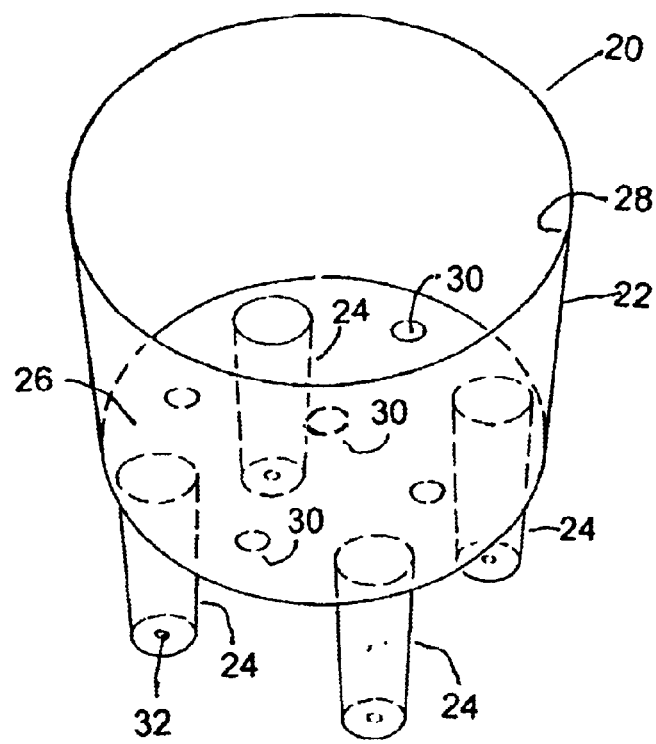
FIG. 1 illustrates a schematic perspective view of a legged pot generally in accordance with the principles of the present invention.
Figure 2:
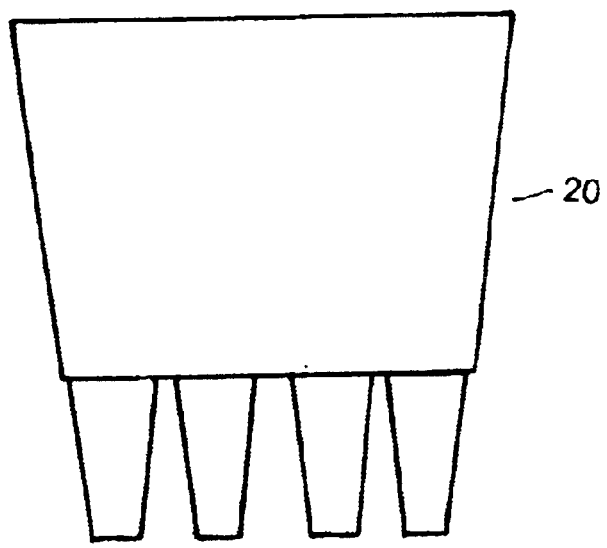
FIG. 2 illustrates a schematic front view of the legged pot of FIG. 1.
Figure 3:
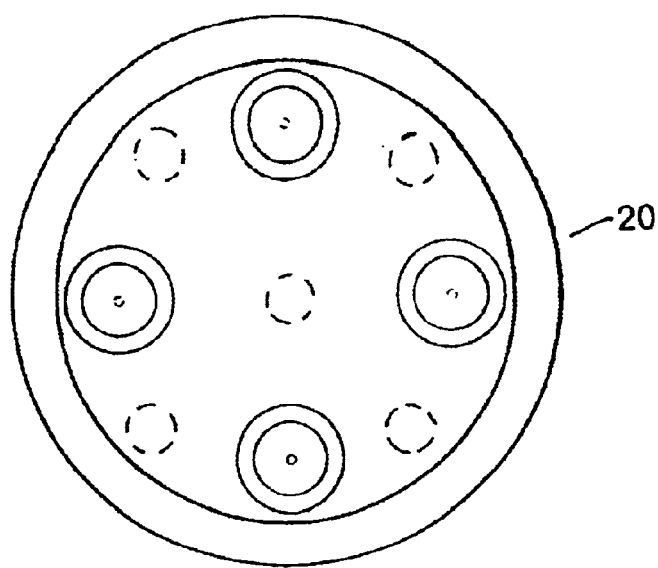
FIG. 3 illustrates a schematic top view of the legged pot of FIG. 1.
Figure 4:
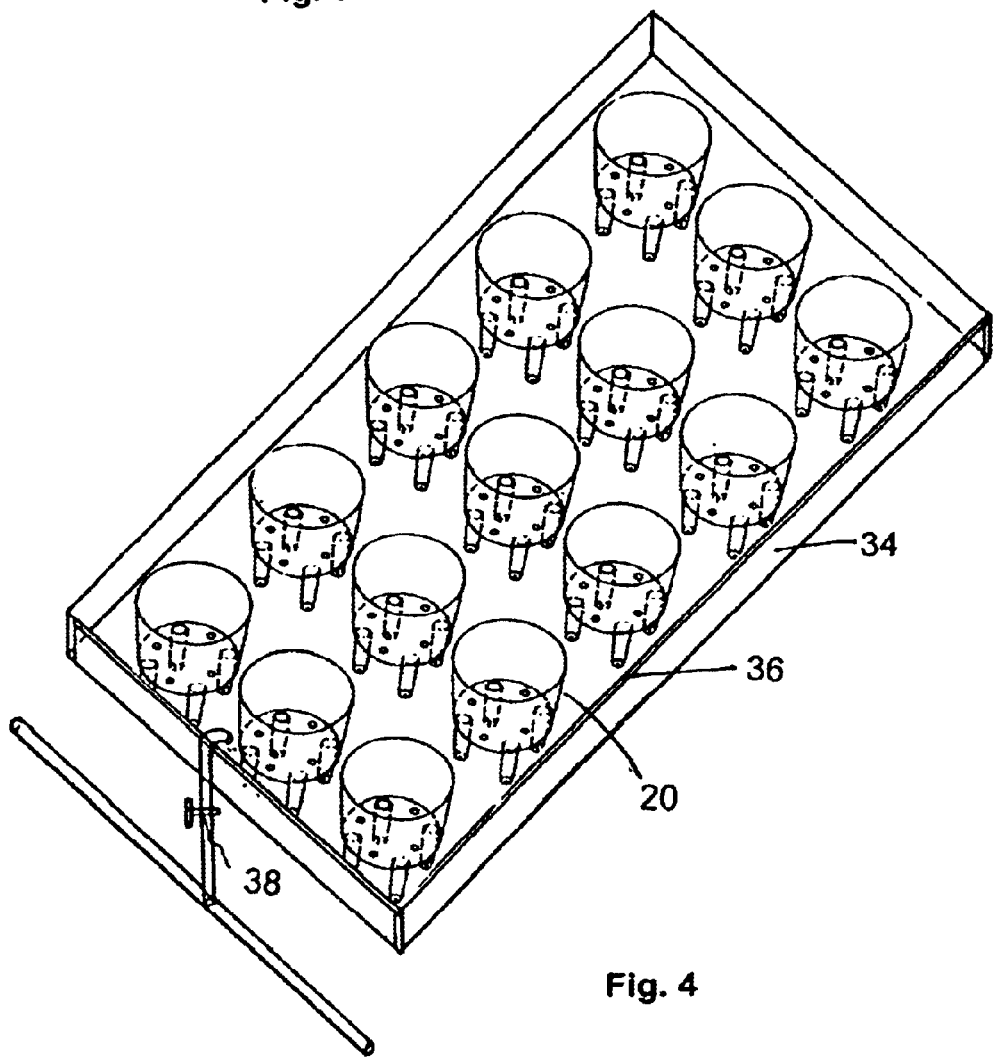
FIG. 4 illustrates a schematic perspective view of a plurality of legged pots of FIG. 1 sitting on a tray.

As shown in FIGS. 1–3, a pot, referenced as 20, includes a pot body 22 and a plurality of legs 24. The pot body 22 has a base 26 which is fluid communication with legs 24, and side walls 28. The base 26 also has a plurality of air circulation vents 30. Each of the legs 24 has a fluid conduit 32 in fluid communication between the pot body 22 and a fluid source (not shown) or a tray 34 (best seen in FIG. 4).

Legged pots used in greenhouses and nursery field with the tray 34, e.g. a plastic film underneath (see FIG. 4) can be watered only once a week or once another week. The sides of film are held up by wooden rods 36, steel wire (not shown), or even by soil to make the tray 34 hold water. The depth of the tray 34 is about 3–5 inches and there is no limit on the length. A faucet 38 can be placed on one end or midway for water irrigation.

Figure 5:
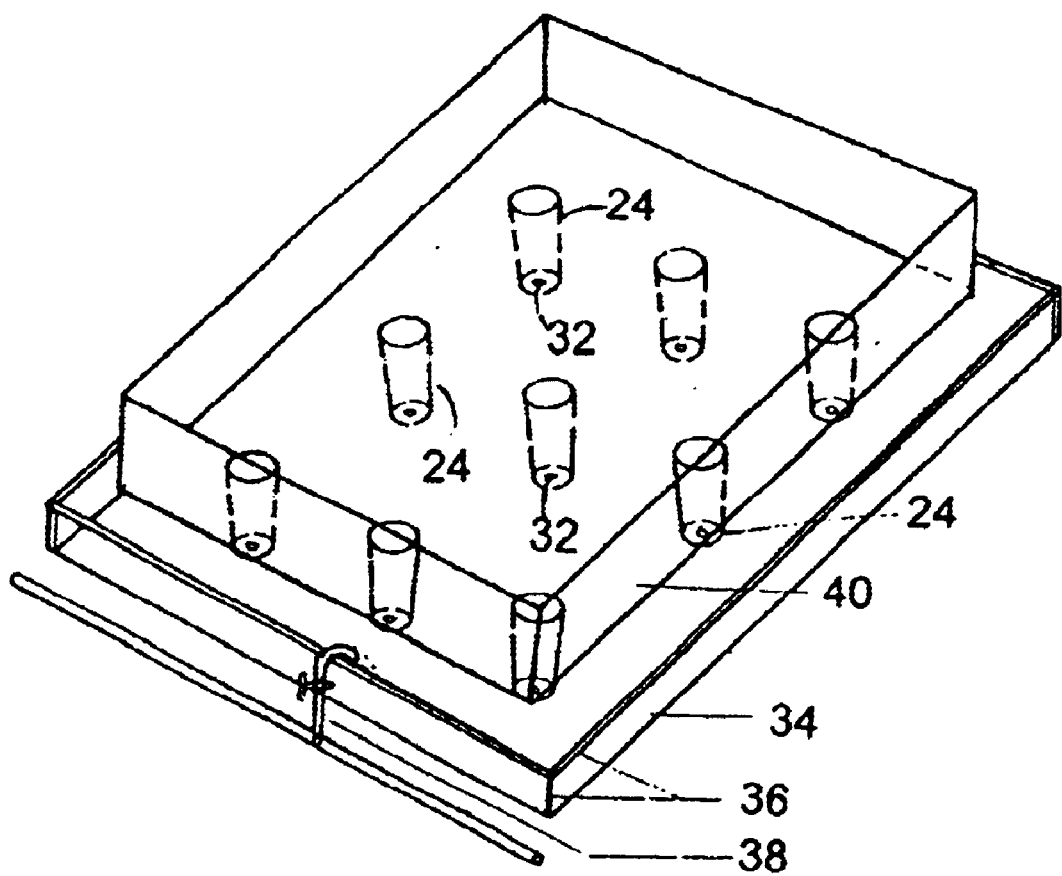
FIG. 5 illustrates a schematic perspective view of a legged box sitting on a tray.

The legs can also be applied to regular trays. It looks like a "Legged Box" 40 (see FIG. 5). Their size can be varied. The depth ranges from 4 to 7 inches. The number and length of the legs depends on the size of the box. Its functions like a flower or vegetable bed. The flat of plastic film used are the same as described in above paragraph.

Each of the legs 24 has a base portion 25 at a first end 27 of the leg 24. The pot body 22 and the legs 24 are filled with soil.

The legged pots or boxes can be used in sand culture to solve the problems. The pots, boxes, and flat of plastic film used are the same as described in above paragraph too.

What is claimed is:

1. A plant pot apparatus, comprising:

a pot body, the pot body having side walls and a bottom wall; and a tray, the tray having side walls and a bottom wall; and at least three legs build into the pot body at a first end separately; and a plurality of air vents disposed on the bottom wall of the pot body; and each of the at least three legs having side walls and a bottom wall at a second end, at least one hole disposed on the bottom wall of the leg, the legs stand in the tray, a fluid conduit is between the first end and the second end of the leg, so that the fluid communication to and from the pot body at the first end and being fluid into the leg at the second end from the tray, and a clearance or distance defined between the lower side walls of the pot body and the up edge of the side walls of the tray for air flowing under the pot, and adding fluid to the tray.

* * * * *